United States Patent

Message et al.

[11] Patent Number: 5,873,658
[45] Date of Patent: Feb. 23, 1999

[54] ROLLING BEARING WITH INFORMATION SENSOR

[75] Inventors: Olivier Message, Tours; Franck Landrieve, Fondettes, both of France

[73] Assignee: SKF France, Clamart, France

[21] Appl. No.: 897,306

[22] Filed: Jul. 21, 1997

[30] Foreign Application Priority Data

Jul. 24, 1996 [FR] France .................................. 96 09296

[51] Int. Cl.⁶ .............................. F16C 32/00; G01P 3/48
[52] U.S. Cl. ...................................... 384/448; 324/207.25
[58] Field of Search ........................... 384/448; 324/174, 324/207.25; 310/168

[56] References Cited

U.S. PATENT DOCUMENTS

| | | | |
|---|---|---|---|
| 4,732,494 | 3/1988 | Guers et al. | 384/448 |
| 4,946,295 | 8/1990 | Hajzler | 384/448 |
| 4,946,296 | 8/1990 | Olschewski et al. | 384/448 |
| 5,158,374 | 10/1992 | Peilloud et al. | 384/448 |
| 5,264,790 | 11/1993 | Moretti et al. | 384/448 X |
| 5,372,435 | 12/1994 | Genero et al. | 384/448 |
| 5,527,114 | 6/1996 | Morita | 384/448 |
| 5,603,575 | 2/1997 | Ouchi | 384/448 X |

FOREIGN PATENT DOCUMENTS

| | | |
|---|---|---|
| 453 331 | 10/1991 | European Pat. Off. . |
| 671 628 A1 | 9/1995 | European Pat. Off. . |
| 2 375 599 | 7/1978 | France . |
| 2 618 516 | 1/1989 | France . |
| 2 668 561 | 4/1992 | France . |
| 3041334 | 6/1982 | Germany . |
| 2 207 470 | 2/1989 | United Kingdom . |

Primary Examiner—Thomas R. Hannon
Attorney, Agent, or Firm—Beveridge, DeGrandi, Weilacher & Young, LLP

[57] ABSTRACT

Rolling bearing comprising a stationary race 1, a rotating race 4, a row of rolling bodies 7 arranged between the stationary race and the rotating race, an encoder means 10 secured to the rotating race and concentric therewith and a sensor means 9 supported by a sensor carrier block 11 secured to the stationary race and arranged facing and a small gap away from the encoder means, the travel of which, during rotation, is detected by the sensor means 9. The rolling bearing comprises a means for trapping the sensor carrier block 11 against a surface 14 of the stationary race 1.

14 Claims, 5 Drawing Sheets

FIG_1
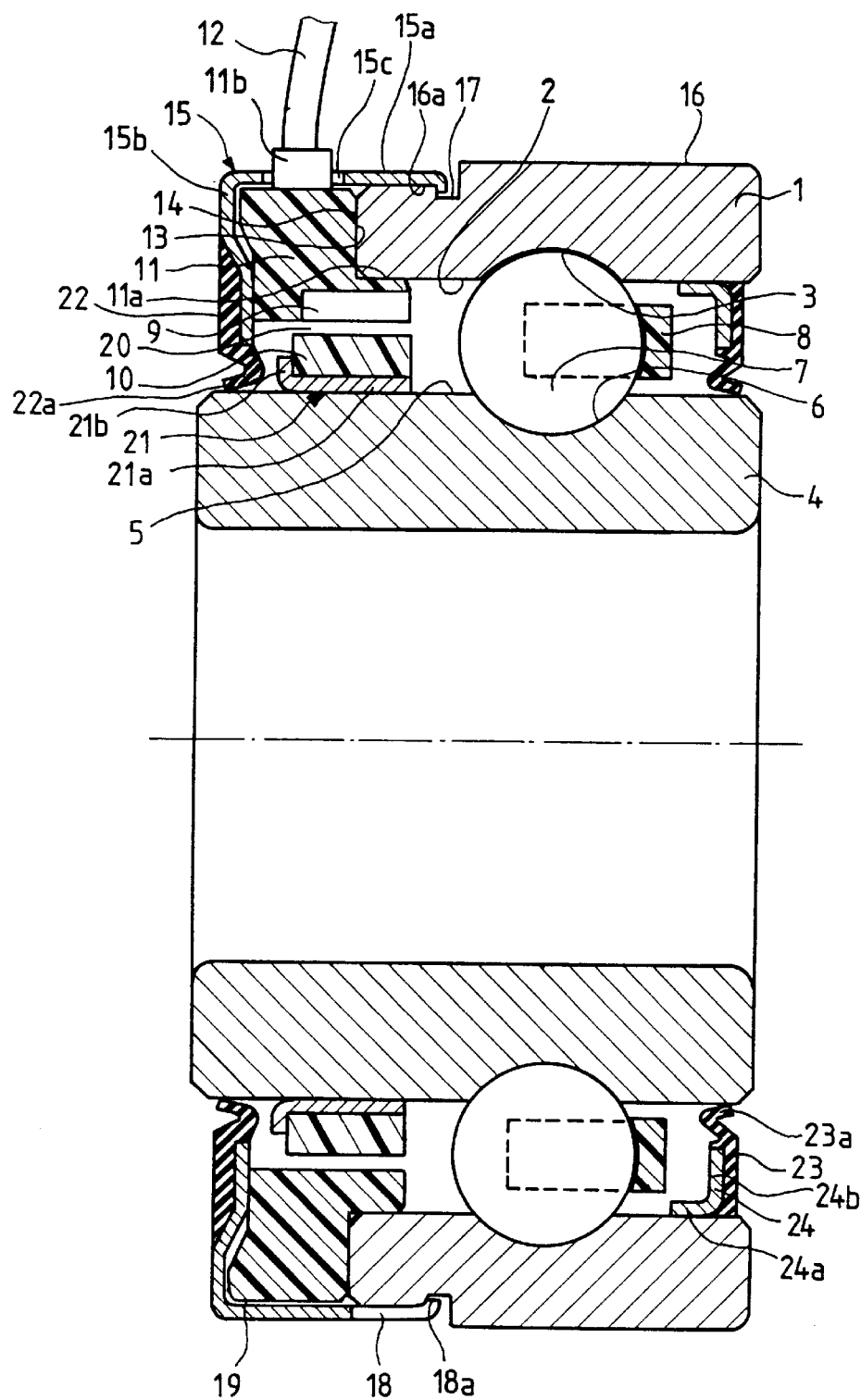

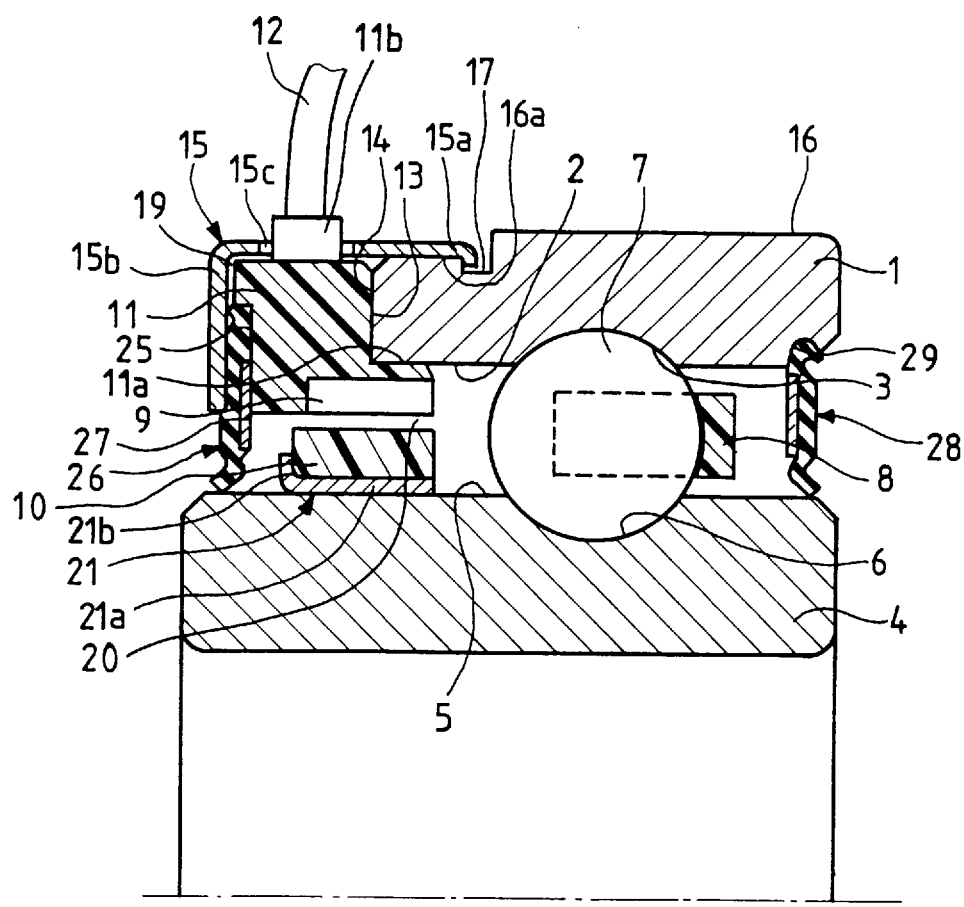
FIG_2

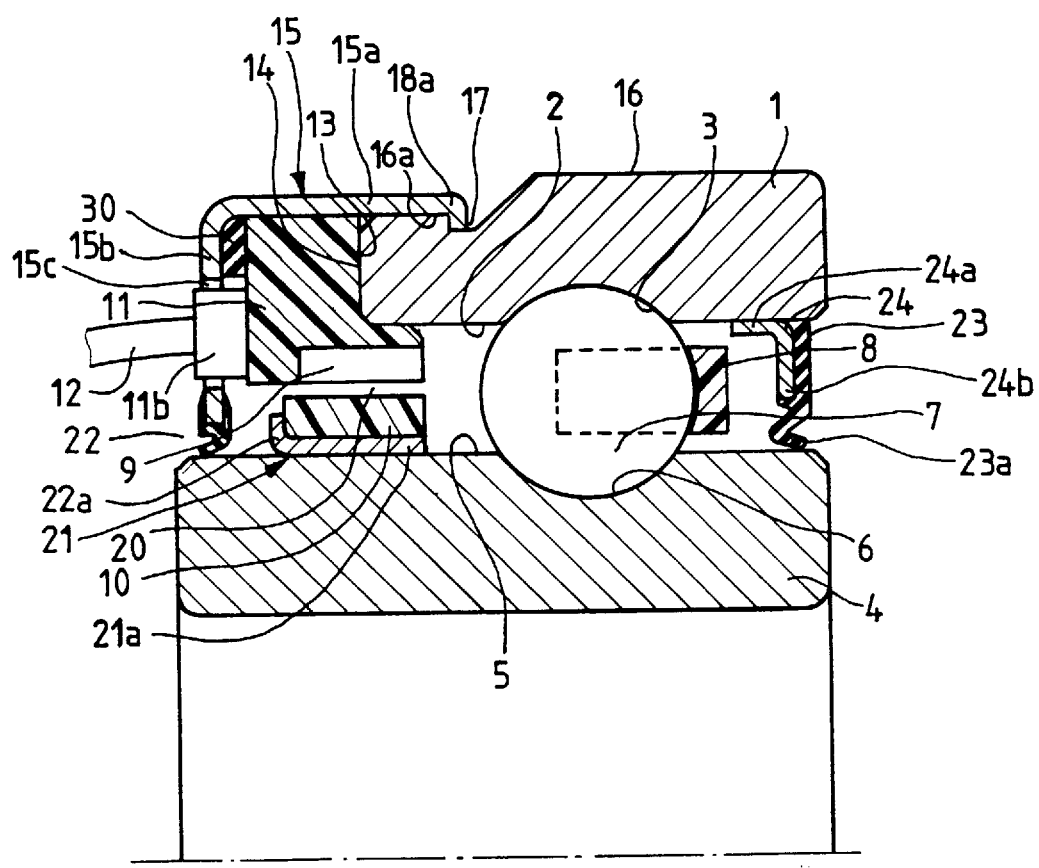
FIG_3

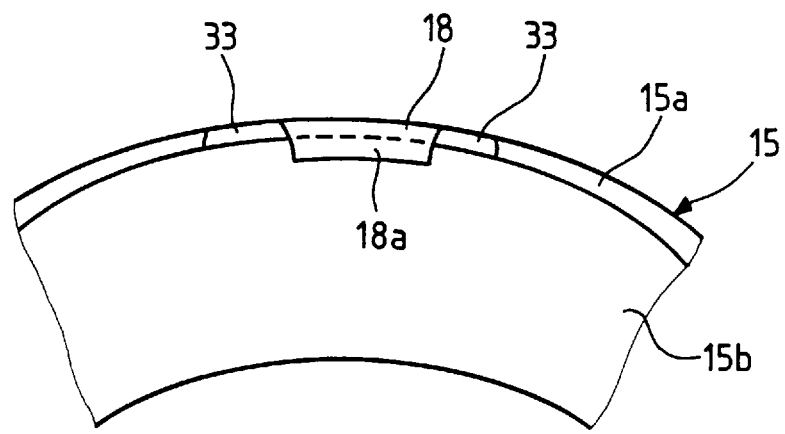
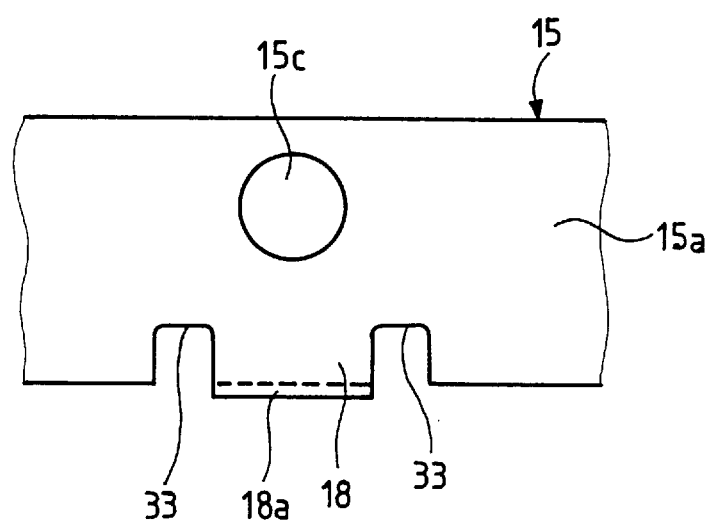

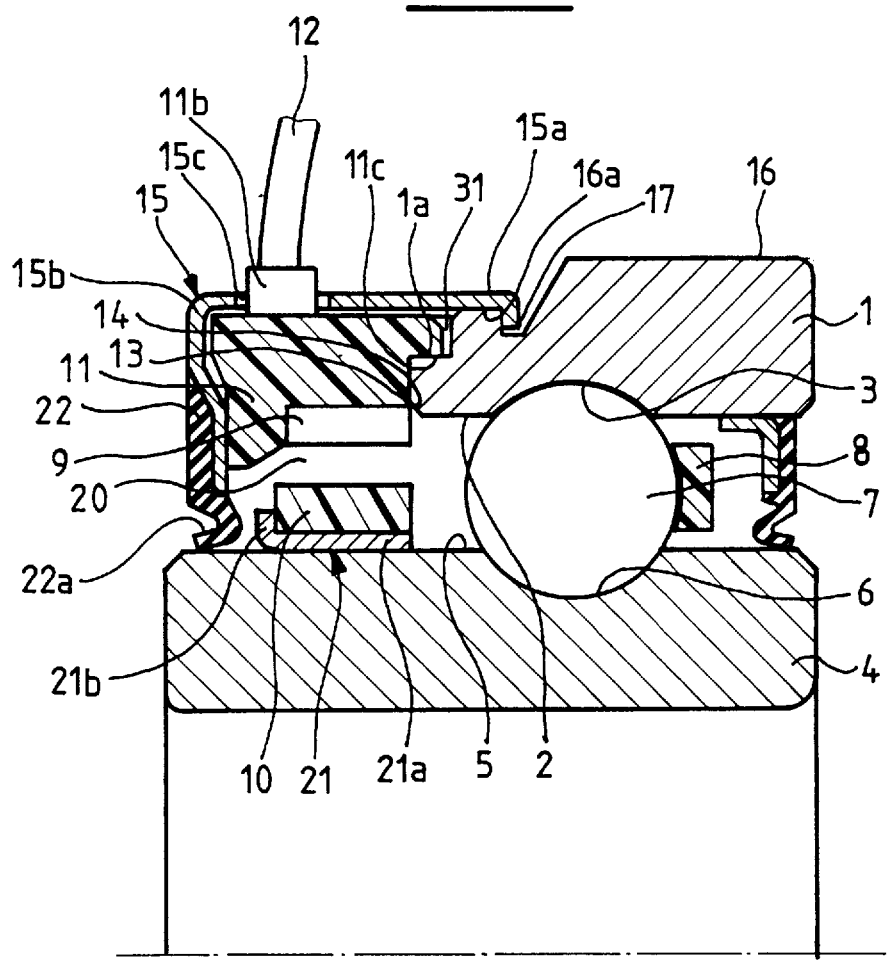
FIG_6

ROLLING BEARING WITH INFORMATION SENSOR

The present invention relates to the field of rolling bearings fitted with information sensors.

Such types of rolling bearings generally have a stationary race and a rotating race, one or more rows of rolling bodies in contact with raceways formed on said races, sealing means, a sensor secured to the stationary race and an encoder secured to the rotating race. The actual sensor is supported by a sensor carrier block.

Document FR-A 2 668 561 discloses a rolling bearing of this type with a seal which supports the sensor and which is fixed to the stationary race of the bearing by an annular peripheral portion of said seal being snap-fitted into a groove formed in the bore of the stationary race. This groove is generally obtained by turning and the manufacturing tolerances on such grooves are therefore relatively wide. Now, the reliability of the signal emitted by the sensor depends greatly on the dimensional accuracy of the gap between the sensor and the encoder. In an assembly of this type where the groove constitutes the reference surface which is supposed both to provide retention and axial and radial positioning of the seal supporting the sensor, there is a risk that the size of the gap between the sensor and the encoder may not fall within acceptable limits, with detrimental consequences on the accuracy and reliability of the signal emitted by the sensor. Furthermore, the lip of the seal comes into rubbing contact with the flank of an elastic ring secured to the rotating race. Contact of this type does not afford all guarantees of satisfactory sealing.

Another rolling bearing is disclosed in document FR-A 2 618 516, and has an information sensor, the sensor here being supported by a sheet metal screen which both retains it and positions it. The sensor holding screen may be fitted onto a cylindrical surface of one of the races or fixed, by deformation of an end edge region, into a groove provided in one of the races. It will be understood that there is a risk that there will be a great deal of spread on the size of the radial gap between the sensor and the encoder as a result of the relatively wide manufacturing tolerances on a sheet metal screen and of deformation of said screen as it is fitted or crimped onto the race which supports it. The signal emitted by the sensor will therefore not have satisfactory reliability.

Document GB-A-1 509 170 (POLYMOTOR) relates to a ball bearing with rotational-speed detector. The detector comprises a magnetic core and a coil and is supported by one of the races, the core projecting between the races and being arranged in such a way as to detect the rotation of the cage with an axial gap. The detector is axially and radially retained by a sheet metal component surrounding the outer race. This method of attachment of the sensor block is not suitable for a detection system with a radial gap, on account of the lack of precision afforded by the sheet metal cap for the reasons already explained above.

What is more, the cap completely envelops the outside diameter of the rolling bearing, and this makes it difficult for the rolling bearing to be fitted correctly into its housing. Finally, the play on the cage as it rotates, and the low number of pulses generated in a complete revolution of one race with respect to the other do not give for a good quality signal.

The object of the present invention is to overcome these drawbacks by providing a rolling bearing with information sensor which has a determined and accurate gap, the bearing nonetheless being economical to manufacture.

Also, the subject of the present invention is a rolling bearing with information sensor in which the sensor carrier block is positioned against a surface of the stationary race.

The rolling bearing, according to the invention, comprises a stationary race, a rotating race, a row of rolling bodies arranged between the stationary race and the rotating race, an encoder means secured to the rotating race and concentric therewith and a sensor means provided with a sensor carrier block secured to the stationary race and arranged facing and a small gap away from the encoder means, the travel of which, during rotation, is detected by the sensor means. The rolling bearing comprises a means for making the sensor carrier block bear against a radial surface of the stationary race. The sensor means is positioned radially on the stationary race by being centered on a cylindrical reference surface of said race, the gap being radial. The rolling bearing comprises a cap surrounding the sensor carrier block and secured to the stationary race in order to provide axial retention of said block. Thus a sensor obtained is perfectly positioned with respect to the stationary race and this makes it possible to obtain an accurate gap.

The cylindrical reference surface may be a bore or an external surface of the stationary race. This reference surface is preferably ground.

In one embodiment of the invention, the bearing comprises a means for the axial positioning of the sensor carrier block, in the form of a radial surface of the stationary race. It is thus possible to manufacture the retaining cap economically with large dimensional tolerances which have no negative effect on the accuracy with which the sensor is positioned with respect to the stationary race, the retaining cap and the positioning means being independent of each other.

Advantageously, the sensor carrier block is made to bear axially against the stationary race by the retaining cap, said cap comprising a cylindrical portion which interacts with the stationary race and a radial portion for retaining and pressing on the sensor carrier block.

In one embodiment of the invention, the cap interacts with an annular groove in the stationary race with the purpose of providing axial retention for said block. The annular groove in the stationary race may be produced by turning, without subsequent grinding. The free end of the cylindrical portion of the cap may be crimped into the groove of the stationary race or alternatively provided with elastic tabs forming hooks and interacting with the groove in the stationary race.

In one embodiment of the invention, the bearing comprises a means for positioning the encoder means with respect to the rotating race. The encoder means may be positioned in contact with a ground surface of the rotating race.

In one embodiment of the invention, the encoder means is positioned on a cylindrical surface of the rotating race.

In one embodiment of the invention, the sensor carrier block is axially elastic.

In one embodiment of the invention, a seal is overmolded onto the cap and comes into rubbing contact with an area of the rotating race.

In another embodiment of the invention, a seal is trapped between the cap and the sensor carrier block and comes into rubbing contact with an area of the rotating race. In these last two embodiments, the lip of the seal, by rubbing on an area of the rotating race, provides a satisfactory seal.

As a preference, the bearing comprises two identical seals, one arranged on each side of the rolling bodies.

Thanks to the invention, it is possible for the function of attaching the sensor carrier block to be separated completely from the function of positioning the same sensor carrier block, and this makes it possible to obtain an accurate gap between the sensor and the encoder. It is thus possible to achieve each of these two functions with economical means, the accuracy of which is appropriate to their respective effect on the quality of the signal.

The invention will be better understood from studying the detailed description of a few embodiments taken by way of non-limiting examples and illustrated by the attached drawings, in which:

FIG. 1 is a view in diametral section of a rolling bearing according to a first embodiment of the invention;

FIG. 2 is a view in diametral half section of a rolling bearing according to a second embodiment of the invention;

FIG. 3 is a view in diametral half section of a rolling bearing according to a third embodiment of the invention;

FIG. 4 is a partial side elevation of the protective cap of FIG. 1;

FIG. 5 is a partial plan view of the protective cap of FIG. 1; and

FIG. 6 is a view in diametral half section of a rolling bearing according to a fourth embodiment of the invention.

As can be seen in FIG. 1, the rolling bearing comprises a stationary outer race 1 provided on its bore 2 with a raceway 3, and a rotating inner race 4 provided on its outer cylindrical surface 5 with a raceway 6. Between the raceway 3 and the raceway 6 there is arranged a row of rolling bodies 7, for example balls, held by a cage 8. The rolling bearing also comprises speed-detection means, namely a sensor 9 secured to the outer race 1 and an encoder 10 secured to the inner race 4. The sensor 9 may be a magnetic sensor, for example a Hall-effect probe and is supported by a sensor carrier block 11 made of a synthetic material. The sensor 9 is connected to dataprocessing means, not represented, by a cable 12.

The sensor carrier block 11 comprises a cylindrical outer surface 11a capable of being centered on a cylindrical reference surface consisting of the bore 2 of the outer race 1, and a radial surface 13 adjacent to the cylindrical surface 11a capable of coming into contact with the front end surface 14 of the outer race 1. The sensor carrier block 11 is thus accurately positioned axially and radially with respect to the outer race 1 and is kept in contact therewith by a cap 15 made of thin metal sheet. The sensor carrier block 11 may be slightly elastic axially either on account of its structure or on account of the material from which it is made, which for example is an elastomer.

The cap 15 comprises a cylindrical portion 15a surrounding the sensor carrier block 11 and a portion 16a of the outer cylindrical surface 16 of the stationary race 1. The cylindrical portion 16a has a smaller diameter than the cylindrical surface 16 which means that the cap 15 does not protrude beyond said cylindrical surface 16. The cylindrical portion 16a and the cylindrical surface 16 meet at an annular groove 17 in which the hook-forming ends 18a of tabs 18 cut in the cylindrical portion 15a of the cap 15 are housed. A space remains between the cylindrical portion 15a and the sensor carrier block 11 so that the position is unchanged.

The cap 15 also comprises a radial portion 15b which meets the cylindrical portion 15a at the opposite end from the tabs 18 and prevents the sensor block 11 from shifting toward the outside of the rolling bearing. The cap 15 is made of thin metal sheet so that the axial elasticity of the radial portion 15b can be used to exert an axial force which brings the sensor carrier block 11 to bear against the front surface 14 of the stationary race 1. To improve the way in which this bearing occurs, it is anticipated that a small space 19 be left between the cylindrical portion 15 and the sensor carrier block 11 and between the radial portion 15b and the sensor carrier block 11 near the cylindrical portion 15a. Only the opposite end of the radial portion 15b to the cylindrical portion 15a is in contact with the sensor carrier block 11 for pushing it elastically against the front surface 14.

The encoder 10 which may be of the magnetic type and produced of plastoferrite is arranged facing the sensor 9 so that it defines a radial gap 20 with the sensor 9. The encoder 10 is supported by a ring 21 made of thin metal sheet comprising a cylindrical portion 21a and a radial retaining edge 21b. The cylindrical portion 21a of the ring 21 for supporting the encoder 10 is fitted onto the outer cylindrical surface 5 of the inner race 4. The inner race 4 is axially lengthened on the same side as the encoder 10 to provide the space needed for fitting the ring 21.

The rolling bearing is equipped with sealing means, a first seal 22 made of elastomeric material overmolded onto the outer face of the free end of the radial portion 15b of the cap 15 and comprises a lip 22a in rubbing contact with the cylindrical outer surface 5 of the inner race 4. The rolling bearing comprises a second seal 23 on the opposite side to the first seal 22. The seal 23 is made of an elastomeric material overmolded onto a sheet metal support element 24 and equipped with a sealing lip 23a in contact with the cylindrical outer surface 5 of the inner race 4. The support element 24 comprises a cylindrical portion 24a fitted onto the bore 2 of the outer race 1, and a radial portion 24b.

During running, the encoder 10 which comprises north poles and south poles alternating in a circle, creates, as it rotates, a variation in magnetic field which variation is detected by the sensor 9 which converts this variation in magnetic field into an electrical signal dispatched down the cable 12. The sensor carrier block 11 has a radial projection 11b forming a support for the cable 12 and projecting radially through a hole 15c made in the cylindrical portion 15a of the cap 15.

The cable 12 emerges from the sensor carrier block 11 from the radial projection 11b and connects the sensor carrier block 11 to the signal exploitation system.

The bore 2 of the outer race 1, which constitutes the cylindrical reference surface on which the sensor carrier block 11 is centered, and the cylindrical outer surface 5 of the inner race 4 are ground surfaces with good geometric accuracy, which makes it possible to define a determined and constant gap 20 between the sensor 9 and the encoder 10, thus guaranteeing that the electrical signal provided by the sensor 9 will be of excellent quality. The groove 17 in which the cap 15 is caught may, for its part, be obtained by turning in an economical way with quite a wide tolerance on accuracy because it has no influence on the accuracy of the gap 20. The lips 22a and 23a of the seals 22 and 23 are in contact with the cylindrical outer surface 5 of the inner race 4, and this guarantees that the rolling bearing is correctly sealed and thus prevents the ingress of dirt from outside near the sensor 9 and the encoder 10 on the one hand, and near the rolling bodies 7 on the other hand.

In FIG. 2, the references of elements similar to those in FIG. 1 have been kept. The sensor carrier block 11 comprises, at the opposite end to its radial surface 14, a housing 25 in the form of a counterbore, in which there is a seal 26 retained axially by the radial portion 15b of the cap 15. The seal 26 comprises a metal ring 27 intended to make it more rigid. The radial portion 15b of the cap 15 exerts an axially directed force on the seal 26. The seal 26 is thus trapped between the radial portion 15b of the cap 15 and the sensor carrier block 11. The seal 26 transmits the axial force from the radial portion 15b of the cap 15 to the sensor carrier block 11 which is thus pressed axially against the front surface 13 of the outer race 1, as in the embodiment of FIG. 1.

On the other side of the rolling bodies 7, the rolling bearing comprises a second seal 28 which is identical to the seal 26 and is fixed in a groove 29 made in the bore 2 of the outer race 1. This standardization of seals on both sides of the rolling bearing allows manufacturing costs to be reduced. It will be observed that the large-diameter portions of the seals 26 and 28 have slightly different appearances. This is because the seal 26 is trapped between the cap 15 and the sensor carrier block 11, while the seal 28 is housed with deformation in the groove 29 which is of a rounded shape.

In FIG. 3, the references of elements similar to those of the previous figures have been observed.

The sensor carrier block 11 is pressed against the front surface 14 of the outer race 1 via the radial portion 15b of the cap 15 via an annular elastic shimming element 30 situated close to the cylindrical portion 15a of the cap 15. The elastic shimming element 30, which is axially elastic, allows the sensor carrier block 11 to be kept pressed against the surface 14 of the inner race 1a without the constraint of accuracy in the axial direction in the manufacture of the cap 15 and of the groove 17.

The elastic shimming element 30 may be a washer made of an elastomeric material or of a metal, of the Belleville or Borelly washer type. It thus becomes possible to take up relatively large manufacturing tolerances while at the same time maintaining an axial elastic preload which presses the sensor carrier block against the race of the bearing.

The front surface 14 of the outer race 1 is precision ground. The hole 15c through which the cable support 11b and the cable 12 emerge is made in the radial portion 15b of the cap 15.

As can be seen in FIGS. 4 and 5, the protective cap 15 is provided on its cylindrical portion 15a with tabs 18 the ends 18a of which are curved radially inward so as to form catching claws capable of interacting with the groove 17 (FIG. 1). To increase the elasticity of the tab 18, it is anticipated that notches 33 be cut in its edges, in the cylindrical portion 15a. It thus becomes easier to fit the cap 15 onto the stationary race 1 of the rolling bearing.

The embodiment illustrated in FIG. 6 is similar to that of FIG. 1, except that the outer face 1 comprises an outer cylindrical surface 1a arranged radially between the bore 2 and the portion 16a of the outer surface 16 and axially adjacent to the front end surface 14. The sensor carrier block 11 comprises a bore 11c designed to be positioned on the cylindrical surface 1a. The sensor carrier block 11 bears axially on the front surface 14. There is a space 31 between the outer race 1 and the sensor carrier block 11 radially between the bore 11c and the portion 16a in order not to interfere with the axial resting against the front surface 14.

This embodiment can be employed, for example, in small rolling bearings when there is not enough radial or axial space between the races for the sensor carrier block to be centered in a bore of the outer race.

Thanks to the invention, the quality of the signal delivered by the sensor through data processing is improved thanks to accurate positioning of the sensor and of the encoder in contact with ground surfaces.

As was seen earlier, the accuracy with which the means of retaining and of attaching the sensor are produced has no effect on the final accuracy of the gap between the sensor and encoder insofar as said means are independent of the means of positioning the sensor.

The retaining and attachment means can therefore be manufactured very economically because they do not require any special accuracy.

We claim:

1. Rolling bearing comprising a stationary race which has a cylindrical reference surface, a rotating race, a row of rolling bodies arranged between the stationary race and the rotating race, an encoder means secured to the rotating race and concentric therewith, a sensor means provided with a sensor carrier block secured to the stationary race and arranged facing the encoder means, said sensor means being spaced from the encoder means by a small gap, the travel of said encoder means during rotation being detected by the sensor means, means for making the sensor carrier block bear against a radial surface of the stationary race, wherein the sensor means is positioned radially on the stationary race by being centered on said cylindrical reference surface of said stationary race, the gap being radial, and a cap surrounding said sensor carrier block and secured to the stationary race in order to provide axial retention of said block.

2. Bearing according to claim 1, wherein the cylindrical reference surface is a bore of the stationary race.

3. Bearing according to claim 1, wherein the cylindrical reference surface is an external cylindrical surface of the stationary race.

4. Bearing according to claim 3, wherein the cylindrical reference surface is ground.

5. Bearing according to claim 1, wherein the stationary race has a radial surface which provides axial positioning of the sensor carrier block.

6. Bearing according to claim 5, wherein the sensor block is made to bear axially against the stationary race by the cap, said cap having a cylindrical portion which interacts with the stationary race and a radial portion for retaining and pressing on the sensor carrier block.

7. Bearing according to claim 6, wherein the cap interacts with an annular groove in the stationary race.

8. Bearing according to claim 7, wherein the cylindrical portion of the cap has a free end which is crimped into the groove of the stationary race.

9. Bearing according to claim 7, wherein the cylindrical portion of the cap has a free end provided with elastic tabs, forming hooks and interacting with the groove in the stationary race.

10. Bearing according to claim 1, wherein the rotating race has a cylindrical surface on which the encoder means is positioned.

11. Bearing according to claim 1, wherein the sensor carrier block is axially elastic.

12. Bearing according to claim 1, wherein a seal is overmolded onto the cap and comes into rubbing contact with an area of the rotating race.

13. Bearing according to claim 1, wherein a seal is trapped between the cap and the sensor carrier block and comes into rubbing contact with an area of the rotating race.

14. Bearing according to claim 1, comprising two identical seals, one arranged on each side of the rolling bodies.

* * * * *